United States Patent Office 3,197,236
Patented July 27, 1965

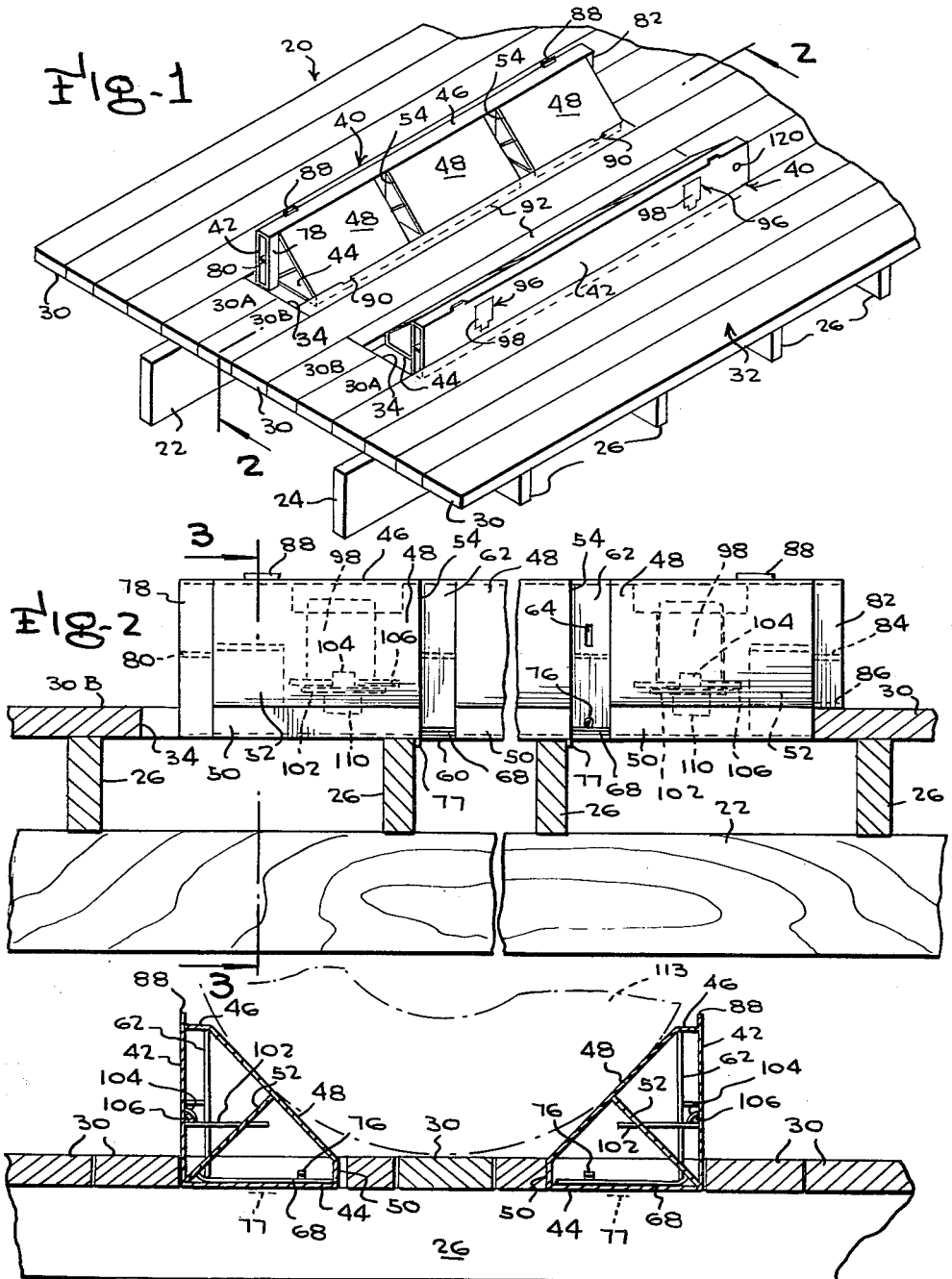

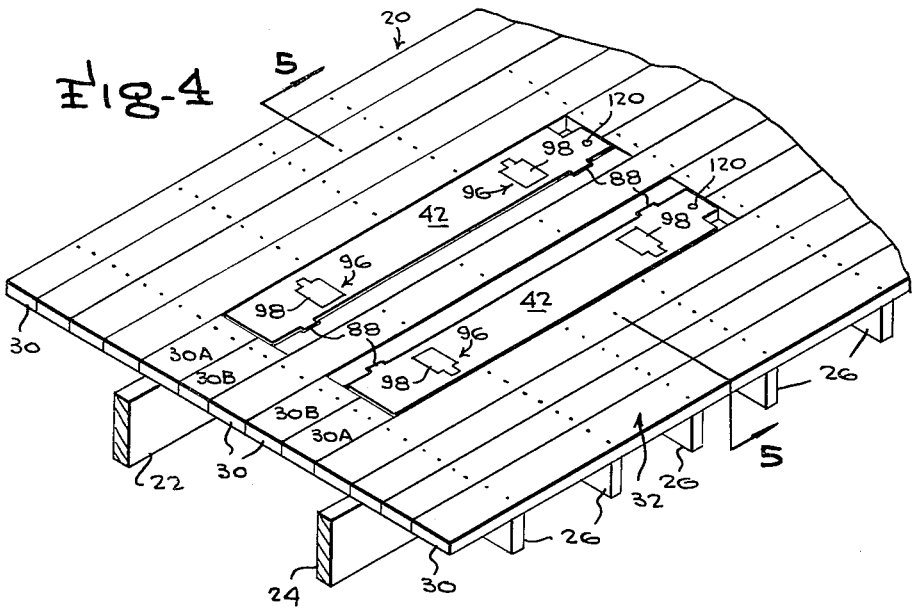
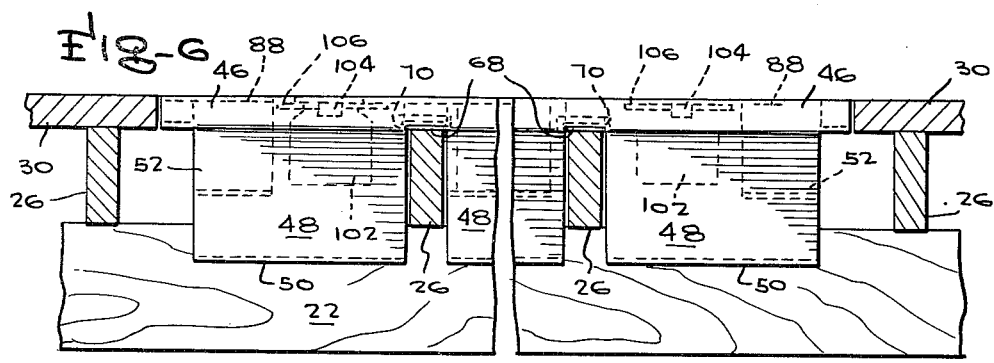
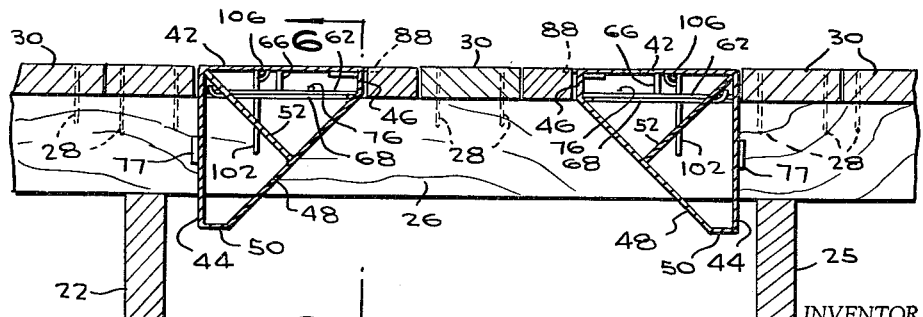

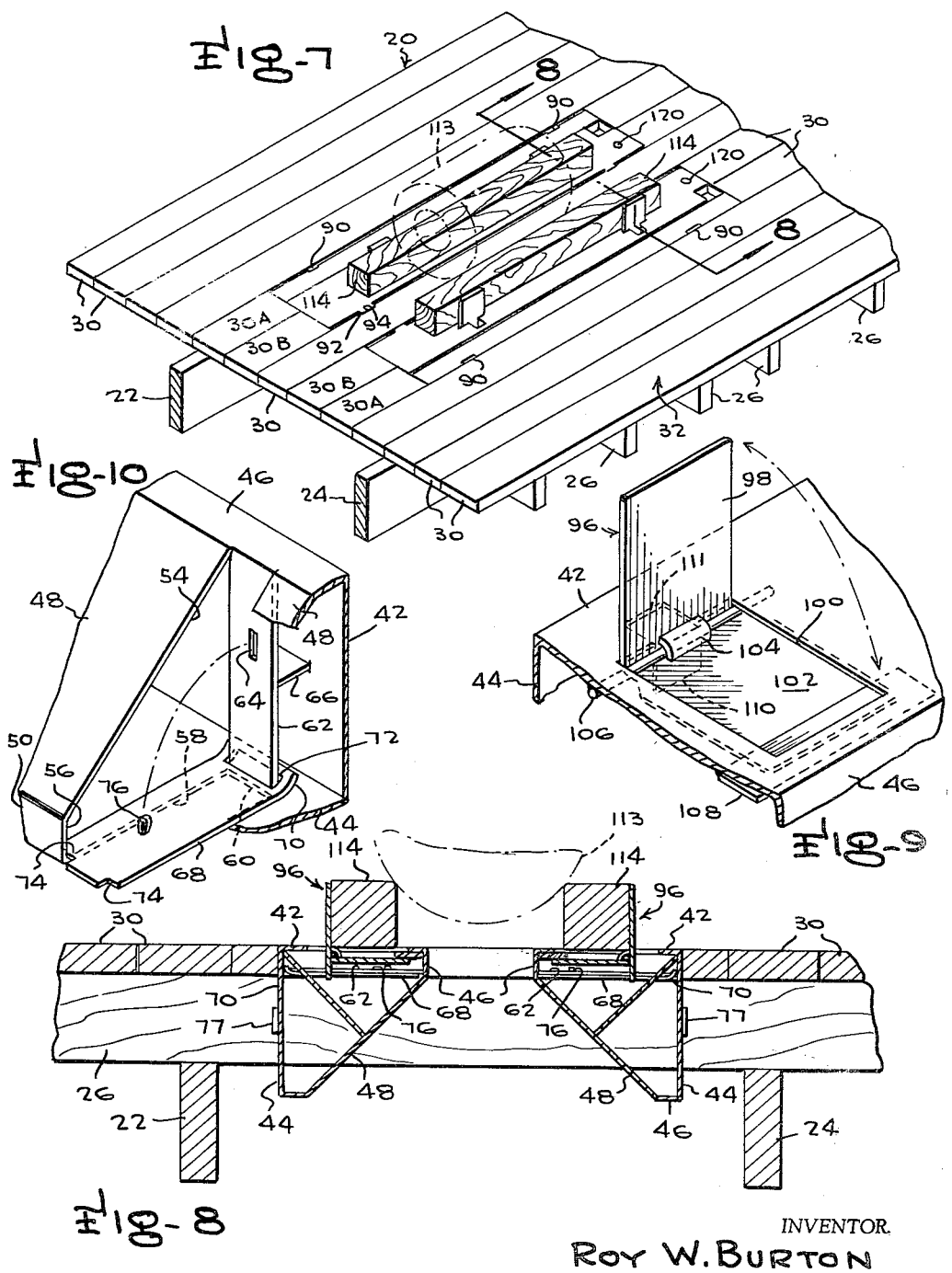

3,197,236
ADJUSTABLE RACK FOR SUPPORTING COIL MATERIALS ON THE FLOOR OR BED OF A VEHICLE
Roy W. Burton, 3051 E. 10-Mile Road, Box 96, Warren, Mich.
Filed Aug. 9, 1963, Ser. No. 301,080
7 Claims. (Cl. 280—179)

This invention relates to the transport of materials normally shipped in coil form and, more specifically, the invention pertains to means for preventing inadvertent moving or shifting of materials being transported in a coil form.

This invention is particularly related to the provision of means for transporting coil stock without using crates, cradles, and considerable bracing during the transport thereof.

The instant invention is directly related to the provision of simplified rack means for prohibiting the inadvertent shifting and rolling of coil stock, the rack means being readily incorporated in existing floors or beds of transport vehicles and which may also be included as a primary object in a vehicle floor as originally constructed.

One of the primary objects of this invention is to provide means for incorporating with vehicle floors or beds a device for preventing the rolling of cylindrical members about their respective longitudinal axes, and with special emphasis to the provision of means to prevent the rolling of coil materials. The proposed means is especially designed to prevent the shifting of an elongated coil while it is in transit in order to eliminate damage to the transport vehicle, as well as to eliminate damage to the product, per se.

A further object of this invention is to provide bracing means of the rack type and in the nature of a vehicle bed insert, the insert, when in its operative position projecting above the plane of the bed of the vehicle, and when moved to its inoperative position, the insert forming a continuation or completion of the bed.

Still another object of this invention is to provide auxiliary means as a part of the rack insert means in order that the rack means may be adapted to accept coils of material of a diameter less than may be accepted by the rack means, itself.

A still further object of this invention is to provide rack-type means preventing the shifting of coil materials, or of essentially cylindrical objects, on the bed of a vehicle, the means normally projecting above the bed when in its operative position, and fitting substantially flush with the bed when in its inoperative position.

This invention contemplates, as a still further object thereof, the provision of means of the type referred to generally, supra, the means being light in weight, noncomplex in construction and assembly, inexpensive to manufacture and which is durable in use.

Other and further objects and advantages of this invention will become more evident from a consideration of the following specification when read in conjunction with the annexed drawings, in which:

FIGURE 1 is a fragmentary perspective view of a truck bed or the bed of any other transport vehicle, FIGURE 1 illustrating the adjustable rack means for receiving coil materials in its operative position;

FIGURE 2 is a partial side elevational view of the rack means shown in FIGURE 1, FIGURE 2 being taken substantially on the vertical plane of line 2—2 of FIGURE 1, looking in the direction of the arrows, and being partly in cross-section;

FIGURE 3 is a fragmentary, detail, cross-sectional view, FIGURE 3 being taken substantially on the vertical plane of line 3—3 of FIGURE 2, looking in the direction of the arrows;

FIGURE 4 is a fragmentary perspective view similar to FIGURE 1, FIGURE 4 showing the rack apparatus in its inoperative position;

FIGURE 5 is a fragmentary, detail, cross-sectional view, FIGURE 5 being taken substantially on the vertical plane of line 5—5 of FIGURE 4, looking in the direction of the arrows;

FIGURE 6 is a side elevational view of the rack apparatus, in its inoperative position, FIGURE 6 being taken substantially on the vertical plane of line 6—6 of FIGURE 5, looking in the direction of the arrows;

FIGURE 7 is a perspective view of the rack apparatus similar to FIGURE 1, but showing in an alterative position and also illustrating the auxiliary means in its operative position accompanied by adjustable means to accommodate coil materials of varying diameters;

FIGURE 8 is a fragmentary, detail, cross-sectional view, FIGURE 8 being taken substantially on the vertical plane of line 8—8 of FIGURE 7, looking in the direction of the arrows;

FIGURE 9 is a fragmentary, enlarged, perspective view of one of the auxiliary holding means; and FIGURE 10 is an enlarged, fragmentary, perspective view of means provided for preventing the accumulation of dust, dirt and other debris on the interior of the insert.

Referring now more particularly to the drawings, reference numeral 20 designates, in general, a conventional truck, trailer or other vehicle bed which includes a pair of longitudinally-extending, substantially rectangular side frame members 22, 24 connected with the vehicle chassis (not shown) in the usual manner, the side frame members being substantially parallel with respect to one another. At longitudinally-spaced intervals, the side frame members 22, 24 are traversed by conventional bolsters 26 also disposed in parallel relationship, one with respect to the others. To the bolsters 26 are secured, by conventional means, nails, for example, as shown in dotted lines in FIGURE 5 at 28, a plurality of longitudinally-extending parallel slats 30 forming a vehicle bed 32. One or more of the slats 30 may be completely or partially interrupted, as is indicated by the reference numerals 30A, 30B which comprise, in effect, extensions of certain adjacent slats 30. The inner ends of the slat extensions 30A, 30B and the immediately adjacent ends of the slats 30 and 30A, 30B cooperate to delineate an opening 34 formed in the bed 32. As is seen in the several figures of the drawings, the opening 34 extends transversely across one or more of the bolsters 26.

Reference numeral 40 denotes, generally, a pair of rack means constructed in accordance with the teachings of this invention, the means being adapted to secure and hold coil materials on the bed 32. Each of the rack means 40 is identical with respect to the other, except that they are of opposite hand. This will become more evident as the specification proceeds. Thus, each rack 40 is seen to comprise a pair of elongated, substantially rectangular tread and base plates 42, 44, respectively, disposed substantially perpendicularly with respect to one another.

That end of the tread plate 42 remotely-disposed with respect to the base plate 44 terminates in an elongated, laterally-extending, substantially rectangular flange 46 which overhangs the base plate 44 in vertically-spaced and parallel relation relative thereto. The outer longitudinally-extending marginal edge of the flange 46 is integral with one longitudinally-extending edge of an elongated, substantially rectangular guide and coil abutment plate 48. The plate 48 extends downwardly from the flange 46, as viewed in FIGURE 3, at an obtuse angle relative thereto and is integral with the upper longitudinally-extending marginal edge of an elongated substantially rectangular flange 50 which has its other longitudinally-extending marginal edge integrally connected to the outer longitudinally-extending marginal edge of the base plate 44. As is seen in FIGURE 3, the flange 50 extends downwardly from the guide and abutment plate 48 at an obtuse angle with respect thereto, and the flange 50 is seen to extend perpendicular to the plate 44 to which the same is fixedly connected.

At longitudinally-spaced intervals, a plurality of flat, elongated, substantially rectangular braces 52 extend from the corner formed at the junction of plates 42, 44 to substantially the mid-section of the plate 48.

The plate 48, the flange 50, and base plate 44 are cut or struck to provide a plurality of bolster-receiving substantially rectangular continuous openings 54, 56 and 58, the latter terminating at a point spaced outwardly from the juncture of the plate 44 with the plate 42 to form a plurality of lips 60, one of which is clearly shown in FIGURE 10. A plurality of struts 62 have an end thereof fixedly secured to the flange 46, and its other end fixedly connected to the lip 60, the struts 62 being perpendicular to the flange 46 and the lips 60 and each of the struts 62 at the forward end of each rack 40 is provided with a substantially rectangular opening 64 extending transversely therethrough to serve a function to be described.

As is seen in the several figures of the drawings, the struts 62 each is in registry with the openings 54, 56 and 58. Interposed between each of the struts 62 and the plate 42 is a spacer and reinforcer substantially rectangular stud member 66.

Reference numeral 68 designates an elongated, substantially rectangular closure member, a closure member 68 being provided for each of the openings 58, and as is seen in the drawings, each closure member 68 is provided with an offset arcuate end 70 which is adapted to bear against its associated lip 60. A slot 72 extends through the arcuate end of each of the closure members 68, the slot 72 extending transversely therethrough. As is clearly seen in FIGURE 10, each closure member 68 receives one of the struts 62 through its slot 72 to pivotally connect the closure member thereon. The other end of each closure member 68 is notched on opposite sides thereof, as at 74, whereby the closure members 68, when the racks 40 are pivoted to their respective operative upright positions as shown in FIGURE 10, fall behind the flange 50 to close the opening 58 against the entry of dust, dirt, or other debris. The closure members 68, with but one exception to which reference will be made below, automatically fall under the force of gravity to their closed positions when the racks 40 are turned to their upright operative positions.

The excepted closure members 68 comprise those which are located adjacent the forward end of each of the racks 40. These closure members 68 are each provided with a resilient spring clip which is adapted to releasably engage within the openings 64 formed in the struts 62 disposed at the forward ends of the racks 40 in order to hold these excepted closure members 68 in juxtaposed substantially parallel relation relative thereto when the racks 40 are initially turned to their upright positions. This structure is utilized in a manner to be described below. It will be understood that the closure members 68, when moving to their closed positions across the openings 58, pivot about their arcuate ends 70 which ride on the base plate 44.

As is seen in FIGURES 2 and 3, the plates 44 are each provided with an outwardly-projecting spacer flange 77 which, when the rack means 40 is elevated and shifted longitudinally, engages against adjacent ones of the bolsters 26 to prevent axial shifting of the racks 40 when once moved to their operative positions. These flanges 77 serves as locking means.

Each rack 40, at one end thereof, carries a side wall 78 (see FIGURES 1 and 2) which extends between and is fixedly secured to the plate 44 and flange 46 in spaced parallel relation relative to the tread plate 42. A spacer member 80 extends between and is fixedly secured to the tread plate 42 and the side walls 78. The other end of each rack 40 is also provided with a side wall 82 which extends parallel to, but is spaced from the tread plate 42. Here, too, a spacer member 84 is interposed between the tread plate 42 and the side wall 82. The side wall 82 extends from the flange 46 substantially the width of the tread plate 42, but terminates short of the plate 44 in an inwardly-extending substantially rectangular step 86 (see FIGURES 1 and 2). The plates 42 at each end of the racks 40 include substantially rectangular lips intermediate the ends thereof which project away from the plate 44, lips 88 being adapted to mesh in cut-outs 90 formed in filler bars 92 disposed in the openings 34 on opposite sides of the slats 30.

An alternate arrangement is shown in FIGURE 7 wherein the filler bars 92 are disposed upon the remotely-disposed sides of the racks 40 and wherein the immediately-adjacent one of the slats 30 is provided with cut-outs 94 to receive the lips 88.

Each of the racks 40 is provided with a plurality of right-angled pivotal support means designated, in general, by the reference numeral 96. Each of these support means 96 includes a first arm 98 (see FIGURE 9) which is adapted to be pivoted into a recess 100 formed in the tread plate 42 in such a manner as to lie flush with respect thereto when the arm 98 is moved to its inoperative position. The arm 98 is integral with one end of a second substantially rectangular arm 102. At the juncture of the arms 98, 102 there is provided an arcuate hinge plate 104 through which extends a pivot pin 106 fixedly secured to the underside of the tread plate 42. As is seen in FIGURE 9, the pin 106 is disposed substantially adjacent one end of the recess 100, and the other end of the recess 100 has a stop bar 108 fixedly secured to the underside of the tread plate 42 whereby the free end of the arm 98 is prevented from turning completely through the recess 100. In order to facilitate the raising of the arm 98, the hinged end thereof is provided with a longitudinally-extending tab 110 which is adapted to be received within a recess 112 formed in the tread plate 42 when the arm 98 is moved to its downward or inoperative position.

Each rack 40 is also provided with an opening 120 formed in the forward end of each tread plate 42 to receive therein a pry bar (not shown) to effect rotation of the racks 40 from their inoperative position (see FIGURE 4) to their operative position (see FIGURE 1) and vice versa.

Having described and illustrated the component elements of this invention in detail, the utility of the device is set forth below.

Referring now to FIGURES 1 to 3, inclusive, the racks 40 are shown in their elevated and operative positions to support a cylindrical row of coiled material, such as is illustrated in phantom lines at 113 in FIGURE 7. As is seen in these three figures, the flanges 76 abut against the upper ends of the bolsters 26 and the step 86 rides on one of the slats 30. This arrangement prevents each of the racks 40 from shifting longitudinally and also prevents the racks from pivoting. The abutment plates 48 on opposite sides of the intermediate slat 30 receive and support the coil material 113 and prevent the same from rolling or shifting laterally of the bed 32 of the vehicle 20.

To render the rack means 40 inoperative, it is only necessary that the operator remove the coil material 113 and rotate each of the racks 40 to their respective down positions, and this may be accomplished, if desired, by inserting a pry bar in the holes 120 to effect leverage on the racks 40. As the racks 40 turn through their respective 90° movement, the flanges 50 move into flush engagement with the upper ends of the bolsters 26 and the closure members 68 begin to swing toward their associated struts 62. A flat lever is then inserted between one of the slats 30 and the adjacent end of the racks 40 and the racks 40 are then slid on the bolsters 26 until the openings 54, 56 and 58 are aligned with the bolsters 26 at which time the racks 40 will drop downwardly thereon to become supported thereby with the tread plate 42 substantially flush with the truck bed 32. The positions of the component elements of the racks 40, when moved to their inoperative positions, are clearly illustrated in FIGURES 4, 5 and 6. As is seen in the several figures of the drawings, when the racks 40 are turned to their inoperative positions the closure members 68 are moved into surface-to-surface contact with their associated struts 62.

In moving to their respective open positions, the operator inserts a pry bar or other analogous tool into the openings 120 and turns the racks 40 in their reverse directions so that the plate 44 now supports the racks 40 on the bolsters 26. The closure plates now fall to close the openings 58 all with the exception of closure member 68 at the forward end of the rack which is held in its upright position by the clips 76. The operator now inserts a pry bar or other similar tool downwardly through the openings 58 between the edge of the plate adjacent the opening 58 and the adjacent bolster 26 and effects leverage thereon to shift the racks 40 in the reverse direction. This last-named closure member is then pivoted to its down position. This returns the racks 40 to their respective positions shown in FIGURES 1 to 3, inclusive.

Depending upon the width of the coils 113 which are to be transported, the arm 98 may be pivoted to its upright position as shown in FIGURE 9, that is, the arms 98 on each oppositely-disposed rack 40, and the coil supported therebetween, or optionally, should the coil be of lesser length than the distance between each arm 98 on each of the racks 40, substantially elongated rectangular chucks 114 may be disposed on the tread plates 42 in confronting relation relative to one another and are braced against lateral displacement by the arms 98. In this connection, reference is made to FIGURES 7 and 8.

Versatility of this invention is also shown to reside in the fact that the filler blocks 92 may be engaged behind the base plate 44 as is shown in FIGURES 7 and 8, or optionally, the same may be disposed immediately adjacent the flanges 46 on opposite sides of one or more centrally-located slats 30. This is shown in FIGURE 5. The variation in the spacing permits the accommodation of rolls or coiled material having varying diameters.

It is to be understood that while only one pair of racks 40 have been described and illustrated herein, a plurality of pairs of racks 40 could be incorporated in the bed of the truck to extend its entire length, should the same be required.

Having described and illustrated several embodiments of this invention in detail, it will be understood that the same is offered merely by way of example, and that this invention is to be limited only by the scope of the appended claims.

What is claimed is:

1. In combination with a vehicle bed supported on a plurality of spaced and substantially parallel bolsters, said bed having a pair of oppositely-disposed openings formed therein and extending transversely therethrough, a pair of oppositely-disposed substantially triangular racks releasably disposed within said openings and extending transversely of said bolsters, each of said racks including an abutment plate and a tread plate, said abutment plates diverging upwardly away from one another and being adapted to support a row of coil material therebetween; each of said abutment plates being provided, intermediate its respective length, with openings extending transversely therethrough, said openings normally being non-aligned with said bolsters when said abutment plates are disposed in their respective operative positions, said racks being shiftable longitudinally of said openings formed in said bed to align said openings formed in said abutment plates therewith whereby said racks may be tilted to cause said bolsters to engage within said openings formed within said abutment plates with said tread plates being disposed substantially flush with the bed of said vehicle.

2. In combination with a vehicle bed supported on a plurality of longitudinally-spaced and substantially parallel bolsters extending transversely of said bed, said bed having a pair of oppositely-disposed substantially rectangular openings formed therein and extending therethrough, a pair of elongated substantially triangular racks each of said racks including a tread plate, an abutment plate, and a base plate, said racks, when disposed in their operative position, having their respective base plates supported on said bolsters with said abutment plates diverging away from one another, means on said base plate engageable with said bolsters to prevent longitudinal shifting of said racks, said racks being disposed, respectively, releasably within each of said openings, and each of said racks having openings extending transversely therethrough said abutment plate and base plate whereby each of said racks may be lifted bodily from said bed and shifted longitudinally and turned to align said openings with said bolsters whereby said tread plate lies flush with respect to said bed of said vehicle.

3. In the combination defined in claim 2, and closure means for closing said opening formed in said base plate when said racks are in their operative positions.

4. In the combination defined in claim 3, and a step projecting laterally from said tread plate at one end thereof engageable with said bed of said vehicle to prevent any pivotal movement of said racks when said racks are in their operative positions.

5. In the combination defined in claim 4, and each of said tread plates having a lip projecting therefrom, each of said bed openings having a filler bar disposed on the proximate sides of said racks, and each of said filler bars having notches formed therein to receive said lips.

6. In the combination defined in claim 4, a filler bar disposed within each of said bed openings on the remotely-disposed sides of said racks, and said bed having notches formed therein to receive lips projecting from each of said tread plates when said rack is turned to its inoperative position.

7. In the combination defined in claim 6, and each of said tread plates having a pair of arms pivotally connected thereon and normally lying flush with said tread plate, said arms being adapted to receive and support thereon a roll of coiled material when said tread plates are flush with the bed of the vehicle.

References Cited by the Examiner

UNITED STATES PATENTS

| 2,127,044 | 8/38 | Mutchler | 105—369 |
| 2,496,916 | 2/50 | Kershaw. | |
| 2,598,068 | 5/52 | Peyton | 280—179 X |
| 2,623,759 | 12/52 | Forbas | 280—179 |

FOREIGN PATENTS

| 146,498 | 8/51 | Australia. |
| 564,801 | 10/44 | Great Britain. |

BENJAMIN HERSH, *Primary Examiner.*

LEO FRIAGLIA, *Examiner.*